Patented Sept. 25, 1951

2,568,971

UNITED STATES PATENT OFFICE 2,568,971

PREPARATION OF SUBSTITUTED PTERIDINES

Barbara Roth, Middlesex, N. J., assignor to American Cyanamid Company, New York, N. Y., a corporation of Maine No Drawing. Application December 3, 1949,
Serial No. 131,048

7 Claims. (Cl. 260—251.5)

The present invention relates to a method of preparing substituted pteridines. More particularly, it relates to the preparation of 2-amino-4-hydroxy substituted pteridines.

Recently, pteroic acid and amino acid amides thereof have been synthesized and in some cases found to possess biological activity. The glutamic acid amides of pteroic acid, such as N-[4-{[(2-amino - 4 - hydroxy-6-pyrimido[4,5 - b]pyrazyl) methyl]amino}benzoyl]-glutamic acid, have been found effective in stimulating the formation of hemoglobin and useful in the treatment of macrocytic anemia, sprue, and other diseases. This compound is also commercially known as "folic acid." A process of preparing this and related compounds is described in the copending application of Coy W. Waller and John H. Mowat, Serial No. 606,704, filed July 23, 1945, now Patent No. 2,500,296.

I have found that these compounds and other substituted pteridines, having an amino group in the 2-position and a hydroxyl group in the 4-position, can be prepared by reacting a 2,4,5-triamino-6-alkoxy or aralkoxypyrimidine, a 3-carbon compound containing groups reactive with amino groups on each of the carbon atoms and para-amino-benzoic acid or an ester or amide thereof. Usually the alkoxy or aralkoxy radicals are partially converted into a hydroxyl radical during the condensation and the conversion is completed during the purification and recovery of the desired product.

The process of preparing the 2-amino-4-hydroxy pteridines of the present invention when using a dihalopropionaldehyde as an intermediate, may be illustrated by the following equation:

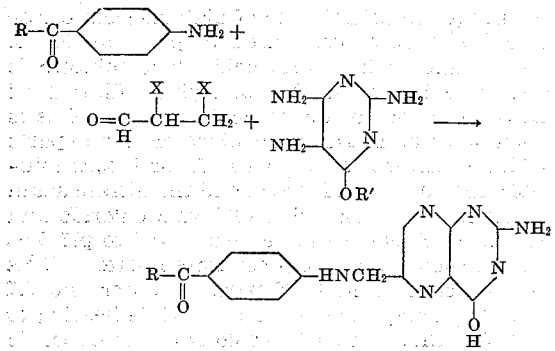

in which R is a hydroxyl, amino or substituted amino radical, R' is an alkyl or aralkyl radical and X is halogen.

The para-aminobenzoyl compound shown in the above equation may be para-aminobenzoic acid, para-aminobenzamide or amino acid amides of para-aminobenzoic acid such as para-aminobenzoylglutamic acid, para-aminobenzoylaspartic acid, and the like. The salts and esters of these para-aminobenzoyl amino acids may also be used in the process.

The second reactant shown above is a dihalopropionaldehyde. Other 3-carbon compounds having reactive groups on each of the carbon atoms can be used such as a 1,1,3-trihalo acetone, reductone, etc. The halogen atoms may be the same or different although the intermediates are usually more easily obtained when they are the same.

The 2,4,5-triamino-6-alkoxy or aralkoxy pyrimidines can be compounds such as 2,4,5-triamino - 6 - methoxypyrimidine, 2,4,5 - triamino - 6-ethoxypyrimidine, 2,4,5 - triamino-6-propionoxypyrimidine, 2,4,5 - triamino-6-butoxypyrimidine, 2,4,5 - triamino - 6 - benzyloxypyrimidine, and the like, which can be prepared by methods described in the chemical literature.

The process of the present invention may vary considerably during the initial condensation with respect to the hydrogen ion concentration. It is desirable, however, that the condensation be carried out under acid conditions at a pH greater than 1. The temperature during the condensation may vary from 0° to about 100° C.

It is preferable that the reaction be carried out in water, or a substantially aqueous solvent, which may consist of water and water miscible solvents. After the condensation and during the course of recovering the product it is desirable that the product be heated under alkaline or acid conditions in order to complete the conversion of the alkoxy or aralkoxy radicals to the hydroxyl radical. This does not usually involve a separate step, particularly where the desired product contains as a portion of the molecule an amino acid since one of the more desirable methods of purifying the product is by the formation of the calcium salt thereof by heating under alkaline conditions in the presence of an inorganic calcium salt as shown in the examples.

The process for preparing representative compounds of the present invention will now be described in detail in the following examples. It will be understood, of course, that other products using intermediates mentioned hereinbefore may be prepared by a similar process. Parts are by weight unless otherwise indicated.

Example 1

A mixture of 50 parts of 2,4-diamino-6-chloropyrimidine and 20.5 parts of sodium methylate dissolved in 395 parts of anhydrous methanol is heated for 6 hours in an autoclave at 120° C. The mixture is cooled, filtered from sodium chloride, and distilled almost to dryness. A tan solid crystallizes; dry weight approximately 46 parts. This is purified by repeated crystallizations from absolute ethyl alcohol, yielding a white product, 2,4 - diamino - 6 - methoxypyrimidine, melting at 161°–162° C. 46 parts of a crude material prepared as described above is dissolved in 350 parts of warm water, and 10 parts of glacial acetic acid added. The mixture is adjusted to pH 4 with sodium hydroxide and filtered from a slight precipitate. It is then heated to 80° C. and a concentrated aqueous solution of sodium nitrite added until a permanent spot on starch-potassium iodide paper is reached. A dark red precipitate of 2,4-diamino-5-nitroso-6-methoxy pyrimidine is formed, which is filtered off and washed with water; dry weight, 29 parts. A suspension of 29 parts of this product in 230 parts of water is heated to 50° C., and 70 parts of sodium hydrosulfite slowly added. The resultant dark yellow solution is acidified to a pH of 2 with 1:1 (by volume) sulfuric acid and cooled to 5° C. A white precipitate slowly forms, which is filtered off and dried; weight, 45.9 parts representing a quantitative yield of 2,4,5-triamino-6-methoxypyrimidine sulfate.

To a solution of 44 parts of 2,4,5-triamino-6-methoxypyrimidine sulfate in 760 parts of water at 45° C. is added 32.4 parts of para-aminobenzoylglutamic acid. The mixture is adjusted to pH 3 and solutions of 12.1 parts of sodium dichromate in 150 parts of water and 35 parts of alpha-beta-dibromo-propionaldehyde in 33 parts of glacial acetic acid simultaneously added dropwise over a 25-minute period, adding sodium hydroxide to maintain the pH at 2.9 to 3.1. The mixture is heated for an additional 20 minutes at 45° C. and pH 3, cooled to 5° C. and filtered. The cake is washed with water and acetone-and-water, and the wet, reddish-brown cake used as such for purification.

Sixty (60) parts of the above crude product is mixed with 2,000 parts of water at 50° C., and 32 parts of 5 N sodium hydroxide added. The solution is stirred at 50° C. for 15 minutes to effect solution, and 15.4 parts of 30% calcium chloride solution is added. The mixture is filtered with the aid of diatomaceous earth, washed with water, and the filtrate adjusted to pH 10.8 with 10% zinc chloride solution. It is filtered again with diatomaceous earth and the filtrate neutralized at 40° C. to pH 3.0. It is cooled to 8° C. for 4 hours and the precipitate collected in the presence of diatomaceous earth. The precipitate is taken up in 1500 parts of water, heated to 50° C., and magnesium oxide added to pH 8.0. The mixture is heated for an additional 15 minutes in the presence of 1.5 parts of activated carbon, clarified, neutralized to pH 3.0 at 40° C., cooled to 8° C. and the precipitate collected with diatomaceous earth. It is then mixed with 1,000 parts of water and 6 parts of lime added. The mixture is heated at 60° C. for 10 minutes, filtered, and 10% zinc chloride solution added to the filtrate to pH 10.8. The solution is refiltered and the filtrate neutralized to pH 3.0, cooled, and the precipitate collected. The above procedure is again repeated, using 4 parts of lime and 800 parts of water. Then after the zinc chloride treatment, the solution is neutralized to pH 8, treated with 0.5 part of activated charcoal at 60° C., clarified, and neutralized to pH 3.0. After cooling to 7° C. for 3 hours, the precipitate is collected, washed with water and acetone and dried; weight, 1.34 parts of dark orange powder. The material has a chemical assay of 71%, calculated as pteroylglutamic acid. When tested as a growth stimulant for *S. faecalis* R., a value of 69.3% of pteroylglutamic acid is obtained.

*Example 2*

To a solution of 24.4 parts of potassium hydroxide pellets (87.5% real) in 395 parts of absolute ethanol is added 50 parts of 2,4-diamino-6-chloropyrimidine. The mixture is heated under reflux with stirring for twenty hours, filtered from potassium chloride, and cooled well. A white precipitate of 2,4-diamino-6-ethoxypyrimidine is formed, which is filtered off and dried; weight, 28.5 parts. Upon recrystallization from ethanol this melts at 167°–169° C. To a solution of 61 parts of this product in 600 parts of water plus 60 parts of glacial acetic acid at 80° C. is added slowly a solution of 27 parts of sodium nitrite in 100 parts of water, the addition being stopped when a permanent spot on starch-iodide paper is reached. A shiny red precipitate is formed, which is filtered off and dried. The 2,4-diamino-5-nitroso-6-ethoxypyrimidine weighs 62.3 parts. To a slurry of 10.7 parts of this product in 86 parts of water at 50° C. is slowly added approximately 30 parts of sodium hydrosulfite, the addition being stopped when all of the red color of the nitroso compound is gone. The solution is then acidified to pH 2 with 1:1 (by volume) sulfuric acid. Upon cooling, a white precipitate of 2,4,5-triamino-6-ethoxypyrimidine sulfate is formed. This is isolated and recrystallized from water, yielding shiny white needles.

To a solution of 56.5 parts of 2,4,5-triamino-6-ethoxypyrimidine sulfate and 26.6 parts of para-aminobenzoylglutamic acid in 1,000 parts of water at 45° C. and pH 3 are added solutions of 43 parts of 2,3-dibromopropionaldehyde in 43 parts of glacial acetic acid and 9.84 parts of sodium dichromate in 57 parts of water dropwise and simultaneously over a twenty-minute period. The pH is maintained at 3 during the addition. Heating at 45° C. is continued for thirty minutes longer, after which the mixture is cooled to 10° C. and the golden-tan product filtered off, washed with water and acetone and dried. The product weighs 56.4 parts and has a chemical assay of 20.3% calculated as pteroylglutamic acid. The bioassay is 8.16% as a growth stimulant for *S. faecalis* R., compared with pteroylglutamic acid as 100%.

24.7 parts of the crude product is slurried in 5,000 parts of water at 80° C. Fifty parts of 5 N sodium hydroxide is added to effect solution, and after thirty minutes 7 parts of calcium chloride in 16 parts of water is added. The mixture is filtered with the aid of diatomaceous earth and the filtrate is then acidified to approximately pH 10.8 with 10% zinc chloride. The mixture is again filtered with the aid of diatomaceous earth, and the filtrate neutralized to pH 3 at 80° C. with dilute hydrochloric acid. The mixture is cooled to 10° C. and the precipitate filtered off in the presence of diatomaceous earth. This is then taken up in 3750 parts of water plus 10 parts of lime. After heating at 80° C. for fifteen minutes, the mixture is filtered, and the filtrate again acidified to pH 10.8 with 10% zinc chloride and clarified. It is once more neutralized to pH 3 at 80° C., cooled, and the precipitate isolated. This is then slurried in 1,500 parts of water and 0.7 part of magnesium oxide added, while heating to 80° C. One part of decolorizing charcoal is added, and heating at 80° C. is continued for 15 minutes, after which the solution is clarified, neutralized to pH 3 at 80° C., cooled, and the precipitate filtered off and dried. This weighs 2.51 parts and has a chemical assay of 55.8% as pteroylglutamic acid at this point. A 2.3 part sample of this material is dissolved in 27 parts of concentrated hydrochloric acid, treated with 2 parts of decolorizing charcoal, clarified, and diluted to 230 parts. On cooling, a yellow precipitate is formed, which is filtered off. This is slurried in 800 parts of water plus 0.5 part of magnesium carbonate and heated to 80° C. until the material is dissolved. It is then treated with 0.5 part of decolorizing charcoal, clarified, and neutralized to pH 3 at 80° C. On cooling, bright yellow crystals are formed, which are boat-shaped under the microscope, a characteristic of pteroylglutamic acid. These are filtered off, washed with water and acetone and dried at 50° C.; weight 0.754 part. The chemical assay is 91.4% as pteroylglutamic acid. When tested as a growth stimulant for *S. faecalis* R., a value of 94.6% as pteroylglutamic acid is obtained.

Example 3

A mixture of 54.2 parts of 2,4,5-triamino-6-methoxypyrimidine sulfate, 26.6 parts of para-aminobenzoylglutamic acid, and 75 parts of 1,1,3-tribromoacetone in 1,000 parts of water is heated to 80° C. for one hour, maintaining the pH between 1.7 and 2.2 by the addition of dilute sodium hydroxide. The pH is then adjusted to 3, the mixture is cooled, and the brown precipitate filtered off, washed and dried. This weighs 49.1 parts, and has a chemical assay of 19.1% calculated as folic acid. The bioassay is 6.48% as a growth stimulant for *S. faecalis* R. The methoxyl value is 3.81%.

47.1 parts of the crude product and 27 parts of lime are mixed with 9,000 parts of water and heated to 80° C. for twenty minutes. The mixture is filtered with the aid of diatomaceous earth, and the filtrate acidified to pH 11.0 with 10% zinc chloride solution. The solution is again clarified, and then neutralized to pH 3 at 80° C. with dilute hydrochloric acid. It is then cooled, and the precipitate filtered off. This is then slurried in 6,750 parts of water at 80° C., sodium hydroxide added to effect solution, and carbon dioxide gas bubbled into the mixture to pH 7, while cooling to 20° C. The mixture is clarified with the aid of diatomaceous earth and neutralized to pH 3 at 80° C. with hydrochloric acid. It is then cooled and the precipitate filtered off. The precipitate is then slurried in 5,000 parts of water at 80° C., and approximately 1.5 parts of magnesium oxide added slowly followed by 3 parts of decolorizing carbon. The mixture is clarified after fifteen minutes, neutralized to pH 3, cooled, and the precipitate filtered off. After drying, this weighs 6.7 parts, and has a chemical assay of 31.7% calculated as folic acid. It is found to contain 1.56% methoxyl. 6.2 parts of this material and 6 parts of lime are mixed with 2,000 parts of water at 80° C. and heated for twenty minutes, after which the mixture is clarified and the filtrate acidified to pH 10.7 with 10% zinc chloride solution. The mixture is again clarified and the filtrate acidified to pH 3 at 80° C. It is then cooled, and the precipitate filtered off and dried. This weighs 4.5 parts and has a chemical assay of 31.1% calculated as folic acid. The bioassay is 23.1% as a growth stimulant for *S. faecalis* R.

Example 4

To a mixture of 54.2 parts of 2,4,5-triamino-6-methoxy-pyrimidine sulfate and 26.6 parts of para-aminobenzoylglutamic acid in 1,000 parts of water at 45° C. are added solutions of 43.2 parts of 2,3-dibromopropionaldehyde in 43 parts of glacial acetic acid and 9.84 parts of sodium dichromate in 57 parts of water dropwise and simultaneously over a twenty-minute period. The pH is maintained at 3 during this period by the addition of dilute sodium hydroxide. The mixture is heated at 45° C. for twenty minutes longer, cooled, and the orange-brown product filtered off, washed with water and acetone, and dried. The crude product weighs 63.5 parts, and has a chemical assay of 16.9% calculated as folic acid. The bioassay is 9.6% as a growth stimulant for *S. faecalis* R. The methoxyl value is 6.00%.

59 parts of the crude product is added to 10,000 parts of water at 80° C., followed by the addition of 115 parts of 5 N sodium hydroxide solution. After fifteen minutes, 16 parts of calcium chloride in 37 parts of water is added, and the mixture is filtered with the help of diatomaceous earth. A 200 part sample is removed and neutralized to pH 3 at 80° C., cooled, and the precipitate filtered off and dried. This has a chemical assay of 35.6% as folic acid, a bioassay of 26.97% growth stimulant, and a methoxyl value of 2.39%. The remaining solution is neutralized to pH 10.85 with 10% zinc chloride, clarified, and the filtrate acidified to pH 3 at 80° C. with dilute hydrochloric acid. It is then cooled, and the precipitate filtered off. A sample of this is dried for analysis, and found to have a chemical assay of 39.0% folic acid, a bioassay of 30.3% growth stimulant, and a methoxyl value of 1.87%. The remaining precipitate is slurried in 7,500 parts of water at 80° C., and sufficient sodium hydroxide added to effect solution. Carbon dioxide gas is then bubbled in to pH 7, while cooling to 20° C. The mixture is clarified and the filtrate acidified to pH 3 at 80° C. with dilute hydrochloric acid. After cooling, the precipitate is filtered off. A sample is removed for analysis, with the following results: chemical assay, 41.4% folic acid; bioassay, 32.5% growth stimulant; methoxyl value, 1.72%. The remaining precipitate is slurried in 6,000 parts of water at 80° C. with 18 parts of lime. After fifteen minutes the mixture is filtered and the filtrate neutralized to pH 10.9 with 10% zinc chloride solution. This is then clarified and neutralized to pH 3 at 80° C. After cooling, the precipitate is filtered off and a sample dried for analysis. The chemical assay is now 52.7% as folic acid; the bioassay is 44.3% growth stimulant; the methoxyl value is 1.27%. The cake is slurried in 4,500 parts of water at 80° C. and 15 parts of lime added. After fifteen minutes the mixture is filtered and the filtrate acidified to pH 10.9 with 10% zinc chloride solution. It is again clarified and neutralized to pH 3 at 80° C., cooled, and the precipitate filtered off. A sample is dried for analysis with the following results: chemical assay, 57.8%; bioassay, 51.1% growth stimulant; methoxyl value, 0.96%. The remaining precipitate is mixed with 4,000 parts of water at 80° C. and 1 part of magnesium oxide added slowly. After ten minutes, 2.2 parts of decolorizing carbon is added, and the mixture is heated fifteen minutes longer. It is then filtered, and the filtrate neutralized to pH 3 at 80° C. After cooling, the precipitate is filtered off, washed with water and acetone, and dried; weight, 4.1 parts. The chemical assay is 71.7% as folic acid; the bioassay is 75.0% growth stimulant, and the methoxyl value is 0.65%. A 2.9 part sample of this is dissolved in 29 parts of concentrated hydrochloric acid and treated with 2.9 parts of decolorizing carbon. It is clarified and diluted to 290 parts, cooled, and the precipitate filtered off, washed with water, and dried. This weighs 1.355 parts and has a chemical assay of 89.0% as folic acid, a bioassay of 87.0%, and a methoxyl value of less than 0.01%. It is then added to 1,200 parts of water at 80° C. and treated with 0.6 part of magnesium carbonate and 0.7 part of decolorizing carbon, followed by clarification and neutralization to pH 3 at 80° C. Yellow boat-shaped crystals are formed on cooling, which after isolation and drying weigh 1.1 parts. The chemical assay is then 93.6% as folic acid; the bioassay is 92.1% growth stimulant for *S. faecalis* R.; the methoxyl value is 0.00%.

*Example 5*

To a solution of 3.6 parts of sodium in 100 parts of benzyl alcohol are added 21.6 parts of 2,4-diamino-6-chloropyrimidine. The mixture is heated to 150°–160° C. for three hours, after which the excess benzyl alcohol is distilled off. The oily residue is washed with water, leaving a gummy solid. The gummy solid is dissolved in 300 parts of warm 30% acetic acid. The solution is clarified to remove impurities, and heated to 80° C. A concentrated sodium nitrite solution is then added dropwise until a permanent spot on starch iodide paper is obtained. A shiny purple precipitate is formed. This is filtered off after cooling, washed with water, and dried. Weight 31.8 parts. This is purified by recrystallization from acetone, in which it forms a blue-green solution. Two parts of this 2,4-diamino-5-nitroso-6-benzyloxypyrimidine is slurried in 79 parts of ethanol and warmed to about 50° C. Hydrogen sulfide is then bubbled rapidly into this mixture until complete decolorization of the nitroso compound has taken place, which requires about twenty minutes. A yellow precipitate is formed which is filtered from the warm solution and discarded. The filtrate is warmed under vacuum until all the residual hydrogen sulfide is removed, and to the resultant solution of 2,4,5-triamino-6-benzyloxypyrimidine is added 0.7 part of diacetyl. The solution is heated under reflux for one hour. On cooling, a yellow precipitate of 2-amino-4-benzyloxy - 6,7 - dimethylpteridine is formed, which is filtered off and dried. Weight, 1.8 parts. This is purified by several recrystallizations from alcohol and then melts at 237–238° (dec.). The alcoholic solutions show a blue fluorescence when diluted with water.

Fifteen parts of 2,4-diamino-5-nitroso-6-benzyloxypyrimidine is reduced as above described. The resultant alcoholic solution, which weighs approximately 400 parts, is diluted with 450 parts of water and 8.14 parts of para-aminobenzoylglutamic acid is added. The pH is adjusted to 3.0, and solutions of 13.2 parts of 2,3-dibromopropionaldehyde in 14 parts glacial acetic acid, and 3.04 parts sodium dichromate in 17 parts of water added dropwise and simultaneously over a 20 minute period while keeping the temperature at 45° C. and the pH at 3. Heating at 45° C. is continued 30 minutes longer, after which the mixture is cooled and the light brown precipitate filtered off. After drying, this weighs approximately 22.1 parts and has a chemical assay of 15.7%.

Purification is accomplished using the same procedure that was used in Example 3. A bright yellow product is obtained with a chemical assay of 90.3% calculated as folic acid.

I claim:

1. A method which comprises reacting together a member of the group consisting of 2,4,5-triamino-6-alkoxypyrimidines and 2,4,5-triamino-6-aralkoxypyrimidines, a member of the group consisting of 2,3-dihalopropionaldehydes and 1,1,3-trihaloacetones and a member of the group consisting of para-aminobenzoic acid, and amides thereof whereby compounds having the general formula:

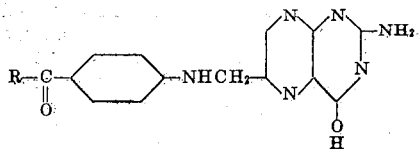

in which R is a member of the group consisting of hydroxyl, amino and amino acid radicals, are produced and recovered.

2. A method which comprises reacting together a 2,4,5-triamino-6-alkoxypyrimidine, a 2,3-dihalopropionaldehyde and an amino acid amide of para-aminobenzoic acid whereby compounds having the general formula:

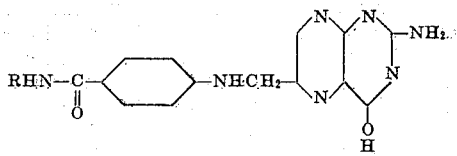

in which NHR is an amino acid radical, are produced and recovered.

3. A method which comprises reacting together a 2,4,5-triamino-6-alkoxypyrimidine, a 2,3-dihalopropionaldehyde and para-aminobenzoylglutamic acid whereby compounds having the formula:

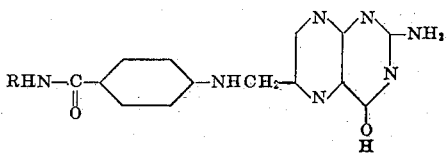

in which NHR is the radical of glutamic acid, is produced and thereafter recovering the said compound.

4. A method which comprises reacting together a 2,4,5-triamino-6-alkoxypyrimidine, a 2,3-dibromopropionaldehyde and para-aminobenzoylglutamic acid whereby compounds having the general formula:

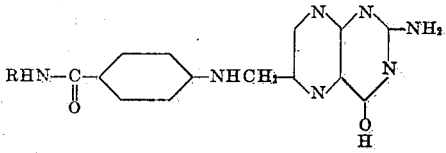

in which NHR is the radical of glutamic acid, is produced and thereafter recovering the said compound.

5. A method which comprises reacting together a 2,4,5-triamino-6-methoxypyrimidine, a 2,3-dihalopropionaldehyde and para-aminobenzoylglutamic acid and after reaction thereof recovering pteroylglutamic acid.

6. A method which comprises reacting together a 2,4,5-triamino-6-ethoxypyrimidine, a 2,3-dibromopropionaldehyde and para-aminobenzoylglutamic acid, and after reaction thereof recovering pteroylglutamic acid.

7. A method which comprises mixing together a 2,4,5-triamino-6-benzyloxypyrimidine, a 2,3-dibromopropionaldehyde and para-aminobenzoylglutamic acid, and after reaction thereof recovering pteroylglutamic acid.

BARBARA ROTH.

No references cited.